(12) United States Patent
Jin et al.

(10) Patent No.: US 11,235,305 B2
(45) Date of Patent: Feb. 1, 2022

(54) MALIC ACID AND KMNO₄-BASED COMBINED AND MODIFIED COW DUNG BIOGAS RESIDUE HYDROCHAR PREPARATION METHOD

(71) Applicant: JIANGSU ACADEMY OF AGRICULTURAL SCIENCES, Suzhou (CN)

(72) Inventors: Hongmei Jin, Jiangsu (CN); Ning Zhu, Jiangsu (CN); Yonglan Xi, Jiangsu (CN); Enhui Sun, Jiangsu (CN); Jing Du, Jiangsu (CN); Hongying Huang, Jiangsu (CN); Xiaomei Ye, Jiangsu (CN); Mengjie Zheng, Jiangsu (CN); Danyang Li, Jiangsu (CN)

(73) Assignee: JIANGSU ACADEMY OF AGRICULTURAL SCIENCES

( * ) Notice: Subject to any disclaimer, the term of this patent is extended or adjusted under 35 U.S.C. 154(b) by 123 days.

(21) Appl. No.: 16/485,114

(22) PCT Filed: Jul. 2, 2018

(86) PCT No.: PCT/CN2018/094122
§ 371 (c)(1),
(2) Date: Aug. 9, 2019

(87) PCT Pub. No.: WO2019/011150
PCT Pub. Date: Jan. 17, 2019

(65) Prior Publication Data
US 2020/0038834 A1    Feb. 6, 2020

(30) Foreign Application Priority Data

Dec. 1, 2017 (CN) .......................... 201711248248.X

(51) Int. Cl.
| | | |
|---|---|---|
| *C01B 31/02* | (2006.01) | |
| *B01J 20/20* | (2006.01) | |
| *B01J 20/28* | (2006.01) | |
| *C01B 32/05* | (2017.01) | |
| *C02F 1/28* | (2006.01) | |
| *C02F 101/16* | (2006.01) | |

(52) U.S. Cl.
CPC ......... *B01J 20/20* (2013.01); *B01J 20/28083* (2013.01); *C01B 32/05* (2017.08); *B01J 2220/4887* (2013.01); *C02F 1/283* (2013.01); *C02F 2101/16* (2013.01)

(58) Field of Classification Search
CPC .................................. C01B 32/05; B01J 20/20
See application file for complete search history.

(56) References Cited

FOREIGN PATENT DOCUMENTS

| CN | 105800588 | 7/2016 | ............. B01J 20/20 |
|---|---|---|---|
| CN | 106128782 | 11/2016 | ............. H01G 11/24 |
| CN | 107352540 | 11/2017 | ............. B01D 53/56 |
| CN | 107469768 | 12/2017 | ............. B01J 20/20 |
| CN | 107903909 | 4/2018 | ............. C09K 17/40 |

OTHER PUBLICATIONS

International Search Report (w/translation) and Written Opinion (w/machine translation) issued in application No. PCT/CN2018/094122, dated Sep. 26, 2018 (14 pgs).
Wu et al., "Characterization of dairy manure hydrochar and aqueous phase products generated by hydrothermal carbonization at different temperatures," Journal of Analytical and Applied Pyrolysis, 127, 2017 (8 pgs).
Zhao et al., "Hydrothermal synthesis of dairy manure hydrochar in the medium of KMnO₄ solution and its adsorption properties for Pb (II)," Environmental Chemistry, vol. 35, No. 12, Dec. 2016, abstract only in English (8 pgs).
Zheng et al., "Preparation of biochars from biogas residue and adsorption of ammonia-nitrogen in biogas slurry," CIESC Journal, vol. 65, No. 5, May 2014, abstract only in English (6 pgs).
Hongmei et al., "Distribution of nitrogen in liquid and solid fraction of pig and dairy manure in anaerobic digestion reactor," Transactions of the Chinese Society of Agricultural Engineering, vol. 28, No. 21, Nov. 2012, English abstract (7 pgs).
Jin et al., "Biochar pyrolytically produced from municipal solid wastes for aqueous As(V) removal: Adsorption property and its improvement with KOH activation," Bioresource Technology 169 (2014) 622-629 (8 pgs).

*Primary Examiner* — Stuart L Hendrickson
(74) *Attorney, Agent, or Firm* — Hayes Soloway P.C.

(57) ABSTRACT

A malic acid and KMnO4-based combined and modified cow dung biogas residue hydrochar preparation method, comprising: mixing a cow dung biogas residue with malic acid, and performing ultrasonic treatment to obtain a malic acid modified cow dung biogas residue; performing a hydrothermal reaction with KMnO4 in a high-temperature high-pressure reactor to obtain a combined and modified cow dung biogas residue hydrochar material.

6 Claims, 2 Drawing Sheets

MALIC ACID AND KMNO₄-BASED COMBINED AND MODIFIED COW DUNG BIOGAS RESIDUE HYDROCHAR PREPARATION METHOD

TECHNICAL FIELD

The present invention relates to the field of adsorbing materials and water environment pollution abatement, particularly to a method for preparing hydrothermal carbon based on malic acid and $KMnO_4$ combined modified cow dung biogas residue.

BACKGROUND ART

Biogas engineering is an effective way to treat animal dung in large-scale livestock farms, and is especially suitable for animal-breeding sewage treatment. In recent years, biogas engineering has grown rapidly in China, and almost become "standard facilities" for large-scale livestock farms. However, biogas engineering produces a large amount of fermentation residues (i.e. biogas slurry and biogas residue) while producing biogas, and the total yield of fermentation residues has exceeded 300 million tons per year. Harmless treatment and recycling of biogas residue is an important approach to make full use of resources and improve the benefits of biogas engineering. Cow dung biogas residue is an ideal raw material for preparing functional carbon materials, owing to its high yield and rich carbon resource therein. By preparing functional carbon materials from cow dung biogas residue, not only the biogas residue can be turned into a valuable resource, but also the industrial chain of biogas engineering can be extended and the additional value of fermentation products can be increased.

At present, bio-carbon with a lot of applications is obtained through pyrolysis and carbonization, in which the reaction temperature is usually 300° C. or higher, and the moisture content of the material is usually not higher than 10%; hydrothermal carbonization (HTC) uses water (usually in a sub-critical state) as the reaction medium, and converts the biomass into hydrothermal carbon in an enclosed high pressure reactor at certain temperature (usually 300° C. or lower) and certain pressure intensity. HTC is not limited by the moisture content of the raw material, the reaction conditions of HTC are mild and the operation is simple, dehydration and decarboxylation in the reaction process are accompanied by heat release, and thereby the energy consumption can be reduced. HTC is especially suitable for treating wastes with high moisture content (usually 85% or higher), such as biogas residue, and can greatly reduce the operation cost. Cow dung biogas residue is slightly alkaline (pH=7.3-7.7), has a moisture content of 80%~90%, and is especially suitable for use as a raw material for HTC; in addition, the preparation conditions are similar to those of other hydrothermal carbon preparation methods. The hydrothermal carbon material prepared from biogas residue can be used in the fields of anaerobic fermentation, adsorption of harmful substances in wastewater, utilization after returning to field, and so on. The hydrothermal carbon material can improve the volumetric gas production rate of anaerobic fermentation system, increase the removal rate of heavy metals in water, and reduce greenhouse gas emission.

At present, there is no report on the research of utilizing cow dung biogas residue as a raw material for preparing hydrothermal carbon yet. However, viewed from the characteristics of bio-carbon prepared from cow dung as a raw material in existing researches, the specific surface area of the obtained bio-carbon is usually small (Ke Wu, Ying Gao, Guangkuo Zhu, Jinjiao Zhu, Qiaoxia Yuan, Yingquan Chen, Mingzhi Cai, Liang Feng, Characterization of Dairy Manure Hydrochar and Aqueous Phase Products Generated by Hydrothermal Carbonization at Different Temperatures, Journal of Analytical and Applied Pyrolysis). Consequently, the pollutant adsorption effect of the bio-carbon is degraded.

The Chinese Patent No. CN107352540A has disclosed a method and an apparatus for preparing manganite-bearing activated carbon, and the Chinese Patent No. CN106128782A has disclosed a nanometer $Mn_3O_4$/activated carbon composite material and a preparation method thereof, but in the two patent documents, the activated carbon is also not modified, and the problem of small surface area also exists. Therefore, it is an urgent task to develop a modified carbon material that has great specific surface area, highly developed pore structures, and stable properties on the basis of the existing method of preparing hydrothermal carbon from cow dung biogas residue, in order to widely apply the technique of preparing hydrothermal carbon from biogas residue.

III. CONTENTS OF THE INVENTION

In view of the above problems, the present invention provides a method for preparing hydrothermal carbon based on malic acid and $KMnO_4$ combined modified cow dung biogas residue, which has an excellent adsorptive property, so as to improve the value of application of hydrothermal carbon prepared from cow dung biogas residue in the field of adsorbing materials.

Specifically, the method for preparing hydrothermal carbon from modified cow dung biogas residue in the present invention comprises the following steps:

1) Milling cow dung biogas residue that is naturally air-dried or oven-dried (at 60~70° C. oven temperature) to 7%~10% moisture content and filtering it through a 20-mesh screen, to obtain a cow dung biogas residue raw material;

In the present application, the cow dung biogas residue is taken from a digestion product of a moderate-temperature complete-mixed anaerobic reactor (CSTR) (Hongmei Jin, Guangqing Fu, Zhizhou Chang, Xiaomei Ye, Guangyin Chen, Jing Du, Form Transformation of Nitrogen in Anaerobic Fermentation of Pig Manure and Cow Dung and Distribution of Nitrogen in Biogas Slurry and Biogas Residue, Journal of Agricultural Engineering).

2) Using the cow dung biogas residue obtained in the step 1) as a raw material, adding 0.5~1.0 mol·L⁻¹ malic acid solution to the cow dung biogas residue, mixing the cow dung biogas residue and the malic acid solution at 1:6~1:10 solid to liquid ratio (w/v, kg/L) homogenously, performing ultrasonic treatment (40 KHz, 100 W) at a temperature of 35~85° C. for 40~90 min., when the reaction product cools naturally to room temperature (20~25° C.), washing the reaction product intensively with deionized water till the eluate is essentially neutral, then filtering the reaction product, drying the reaction product naturally or drying it in an oven at a temperature of 55~80° C.; thus, malic acid modified cow dung biogas residue is obtained;

3) Adding 0.13~0.25 mol·L⁻¹ $KMnO_4$ solution to the malic acid modified cow dung biogas residue obtained in the step 2), mixing the malic acid modified cow dung biogas residue and the $KMnO_4$ solution homogenously, loading the obtained mixture into a high temperature and high pressure reactor, and performing a hydrothermal reaction at 180~220° C. for 2~3 h with heating rate of 1~5° C.·min$^{-1}$; the solid to liquid ratio (w/v, kg/L) of the malic acid modified cow dung biogas residue to the KMnO$_4$ solution is 1:5~1:10.

4) Cooling the reaction product after the reaction in the step 3) is finished, washing the reaction product with deionized water intensively till the eluate is essentially neutral, filtering the reaction product, drying the reaction product naturally or drying it in an oven at 55~80° C.; thus, the hydrothermal carbon based on modified cow dung biogas residue is obtained.

Compared with the existing methods for preparing hydrothermal carbon, the method provided in the present invention attains the following beneficial effects:

1) In the present invention, the raw material is modified with a malic acid and KMnO$_4$ combined modification method; thus, the abundance of C/O functional groups contained in the hydrothermal carbon material can be increased by means of the malic acid to a certain degree, and KMnO$_4$ can attain a purpose of expanding and increasing pores in the material; the modified hydrothermal carbon has obviously increased specific surface area, and the pores are mainly mesopores in terms of the pore diameter distribution.

2) The hydrothermal carbon material obtained with the method in the present invention has high adsorptive capacity for harmful substances such as ammonia nitrogen (NH$_4^+$—N); compared with hydrothermal carbon based on unmodified cow dung biogas residue, the adsorptive capacity of the modified hydrothermal carbon is up to 12.14 times of the adsorptive capacity of unmodified hydrothermal carbon.

3) In the present invention, a fermentation byproduct—cow dung biogas residue—is selected as a raw material, which is cheap and widely available, and such a selection can avoid secondary pollution; moreover, by turning such a waste into a resource and utilizing it as a valuable resource, the application effect and utilization value of hydrothermal carbon based on cow dung biogas residue can be improved, and the benefits and development of biogas engineering can be promoted.

IV. DESCRIPTION OF DRAWINGS

FIG. 1 shows scanning electron microscope (SEM) images of hydrothermal carbon based on modified cow dung biogas residue and hydrothermal carbon based on unmodified cow dung biogas residue;

In the figure: (a) unmodified hydrothermal carbon; (b) modified hydrothermal carbon.

V. EMBODIMENTS

Figure 1:
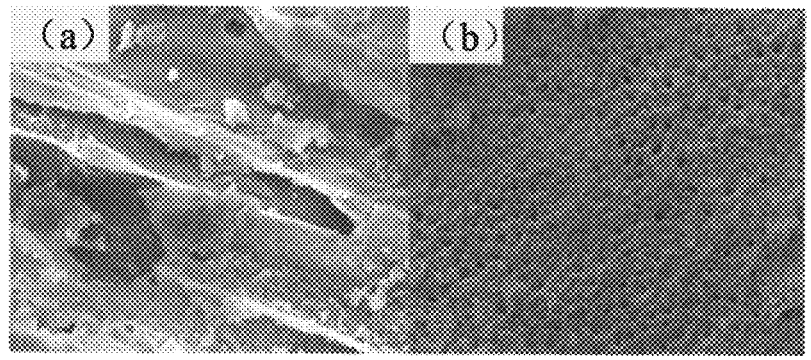

Hereunder the present invention will be fully described in the following examples. However, it should be noted that the involved specific parameters are provided only for the purpose of fully exhibiting the features and advantages of the present invention, and those skilled in the art can realize further popularization and application without departing from the connotation of the present invention.

Please see the document "Hongmei Jin, Guangqing Fu, Zhizhou Chang, Xiaomei Ye, Guangyin Chen, Jing Du, Form Transformation of Nitrogen in Anaerobic Fermentation of Pig Manure and Cow Dung and Distribution of Nitrogen in Biogas Slurry and Biogas Residue, Journal of Agricultural Engineering" for the source of the cow dung biogas residue in the examples; the cow dung biogas residue is naturally air-dried or oven-dried at 60~70° C. to 7%~10% moisture content, milled, and then filtered through a 20-mesh screen.

Example 1. Preparation of Hydrothermal Carbon Based on Male Acid and KMnO$_4$ Combined Modified Cow Dung Biogas Residue Experimental Group:
1) 0.5 mol·L$^{-1}$ malic acid solution is added into an appropriate amount of cow dung biogas residue at 1:10 solid to liquid ratio (w/v, kg/L) (in the specific implementation, the solid to liquid ratio of the cow dung biogas residue to the malic acid may be selected within a range of 1:6~1:10), after uniform mixing, the mixture is treated by ultrasonic treatment at 50° C. for 60 minutes (40 KHz, 100 W); the obtained solid-liquid mixture is filtered, washed with water till the eluate is neutral, and then dried at 55~80° C.; thus, malic acid modified cow dung biogas residue is obtained;

2) The malic acid modified cow dung biogas residue obtained in the step 1) is mixed with 0.1367 mol·L$^{-1}$ KMnO$_4$ solution (in the specific implementation, the concentration may be within a range of 0.13~0.25 mol/L) at 1:8 solid to liquid ratio (w/v, kg/L) (in the specific implementation, the solid to liquid ratio of the malic acid modified cow dung biogas residue to the KMnO$_4$ solution may be selected within a range of 1:5~1:10) to a homogeneous state, and then the mixture is subjected to a hydrothermal reaction at 220° C. for 2 h with 1~5° C.·min$^{-1}$ heating rate in a high temperature and high pressure reactor; after the reaction is finished, the reaction product is cooled down, washed with water till the eluate is essentially neutral, filtered, and dried at 55~80° C.; thus, hydrothermal carbon based on malic acid and KMnO$_4$ combined modified cow dung biogas residue (G-HTC) is obtained;

Control group: an appropriate amount of cow dung biogas residue powder is fully mixed with deionized water at 1:8 solid to liquid ratio (w/v), then the mixture is subjected to a hydrothermal reaction at 220° C. for 2 h with 1~5° C.·min$^{-1}$ heating rate in a high temperature and high pressure reactor, after the reaction is finished, the reaction product is cooled down, washed with water till the eluate is essentially neutral, filtered, and dried at 55~80° C.; thus, hydrothermal carbon based on unmodified (control group) cow dung biogas residue (Y-HTC) is obtained.

The elemental composition and specific surface area of G-HTC and Y-HTC are shown in Table 1 respectively: please see the document "Hongmei Jin, Sergio Capareda, Zhizhou Chang, Jun Gao, Yueding Xu, Jianying Zhang, Biochar Pyrolytically Produced from Municipal Solid Wastes for Aqueous As (V) Removal: Adsorption Property and Its Improvement with KOH Activation. Bioresouree Technology" for the determination method.

TABLE 1

Specific Surface Area and Elemental Composition of Hydrothermal Carbon Based on Cow Dung Biogas Residue

| Sample No. | Elemental composition (%) | | | | | Specific surface area ($m^2 \cdot g^{-1}$) | Total pore volume ($cm^3 \cdot g^{-1}$) | Average pore diameter (nm) |
|---|---|---|---|---|---|---|---|---|
| | C | H | O | N | S | | | |
| Y-HTC | 39.81 | 4.26 | 21.15 | 1.86 | — | 5.52 | $3.1 \times 10^{-2}$ | 22.27 |
| G-HTC | 44.79 | 4.95 | 23.30 | 1.85 | — | 15.44 | $9.4 \times 10^{-2}$ | 24.34 |

As can be seen from Table 1, the pores of G-HTC and Y-HTC are mainly mesopores, and the specific surface area of G-HTC is significantly increased compared with that of Y-HTC, almost by 179.78%; the C/O content is at the top position in Y-HTC and G-HTC, and the C/O content in G-HTC is higher than that in Y-HTC.

The scanning electron microscope (SEM) images of G-HTC and Y-HTC are shown in FIG. 1. As shown in FIG. 1, the surface of the unmodified hydrothermal carbon Y-HTC (FIG. 1a) has long trenches and has less pores; the surface of the modified hydrothermal carbon G-HTC (FIG. 1b) has obviously improved porosity and is in a cellular form.

In the specific implementation process, the ultrasonic treatment in the step 1) may be performed within a temperature range of 35~85'C, at 40 KHz, with a power of 100 W, for 40~90 minutes, in order to attain the object of the present invention;

The hydrothermal reaction may be performed at 180~220° C. for 2~3 h with 1~5° C./min heating rate, in order to attain the object of the present invention.

Example 2

0.3 g G-HTC obtained in the example 1 is weighed and loaded into a 250 mL conical flask, and 100 mL ammonia nitrogen ($NH_4^+$—N) solution at different concentrations (20 mg·$L^{-1}$, 50 mg·$L^{-1}$, or 100 mg·$L^{-1}$) is added into the conical flask respectively; each experiment is repeated for three times; the mixture is shaken on a constant temperature shaking table (28° C., 220r·$min^{-1}$) for 3 h to achieve adsorption equilibrium, then the supernatant is taken and filtered through a 0.45 μm filter membrane, the concentration of ammonia nitrogen ($NH_4^+$—N) in the filtrate is measured with an ultraviolet-visible spectrophotometer; at the same time, the Y-HTC obtained in the example 1 is treated with the same steps described above for comparison.

Figure 2:
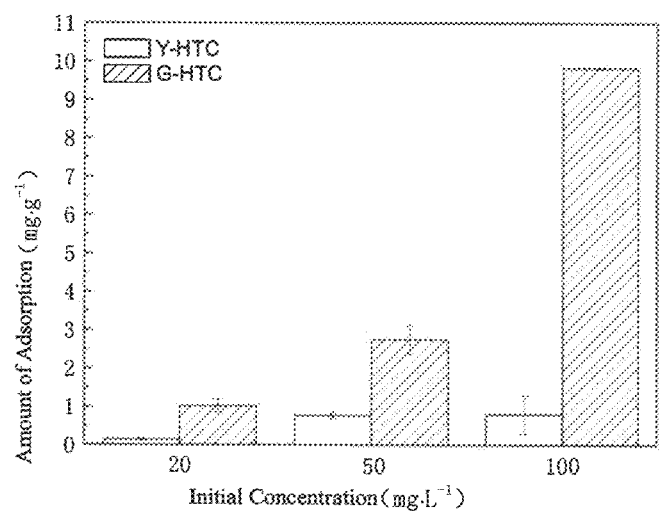
FIG. 2 shows schematic diagram of adsorption effects of hydrothermal carbon based on modified cow dung biogas residue and hydrothermal carbon based on unmodified cow dung biogas residue for ammonia nitrogen (NH$_4^+$—N) at different initial concentrations.

The experimental results are shown in FIG. 2. As can be seen, the adsorption effect of G-HTC and Y-HTC for ammonia nitrogen ($NH_4^+$—N) is increased as the initial concentration of ammonia nitrogen is increased; in addition, when the concentration of ammonia nitrogen ($NH_4^+$—N) is 100 mg·$L^{-1}$, the adsorptive capacity of G-HTC is as high as 9.83 mg·$g^{-1}$, while the adsorptive capacity of Y-HTC is only 0.81 mg·$g^{-1}$, indicating that the hydrothermal carbon based on modified cow dung biogas residue has better adsorptive capacity for ammonia nitrogen ($NH_4^+$—N).

Example 3

0.3 g G-HTC obtained in the example 1 is weighed and loaded into a 250 mL conical flask, 100 mL ammonia nitrogen ($NH_4^+$—N) solution at 100 mg·$L^{-1}$ concentration is added into the conical flask, the mixture is shaken on a constant temperature shaking table (28° C., 220r·$min^{-1}$), the supernatant is taken at different sampling times (0, 15, 30, 60, 90, 120, 150, 180 min) and filtered through a 0.45 μm filter membrane, the concentration of ammonia nitrogen ($NH_4^+$—N) in the filtrate is measured with an ultraviolet-visible spectrophotometer; at the same time, the Y-HTC is treated with the same steps described above for comparison.

Figure 3:
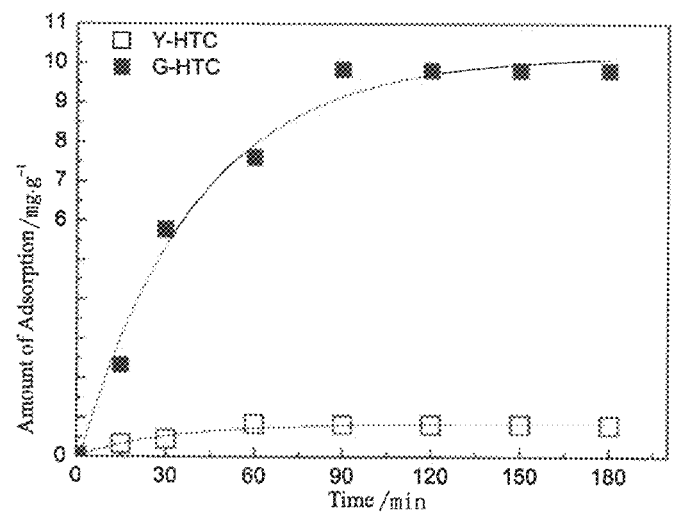
FIG. 3 shows schematic diagram of kinetic effects of adsorption of hydrothermal carbon based on modified cow dung biogas residue and hydrothermal carbon based on unmodified cow dung biogas residue for ammonia nitrogen (NH$_4^+$—N)

The detection results are shown in FIG. 3. as can be seen, the maximum adsorptive capacity of G-HTC for ammonia nitrogen ($NH_4^+$—N) is 12.21 times of that of Y-HTC, and both G-HTC and Y-HTC achieve adsorption saturation within 60 min.

Example 4

0.3 g G-HTC obtained in the example 1 is weighed and loaded into a 250 mL conical flask, and 100 mL dilute solution of waste water from a pig farm (taken from a sedimentation tank in the pig farm, the $NH_4^+$—N concentration of the stock solution is about 200 mg·$L^{-1}$) is added into the conical flask, i.e., the stock solution is diluted with water so that the $NH_4^+$—N concentration of the waste water is 20, 50, and 100 mg·$L^{-1}$ respectively; the mixture is shaken on a constant temperature shaking table (28° C., 220r·$min^{-1}$) for 3 h, the supernatant is taken and filtered through a 0.45 μm filter membrane, and the $NH_4^+$—N concentration in the filtrate is measured with an ultraviolet-visible spectrophotometer, at the same time, the Y-HTC is treated with the same steps described above for comparison.

Figure 4:
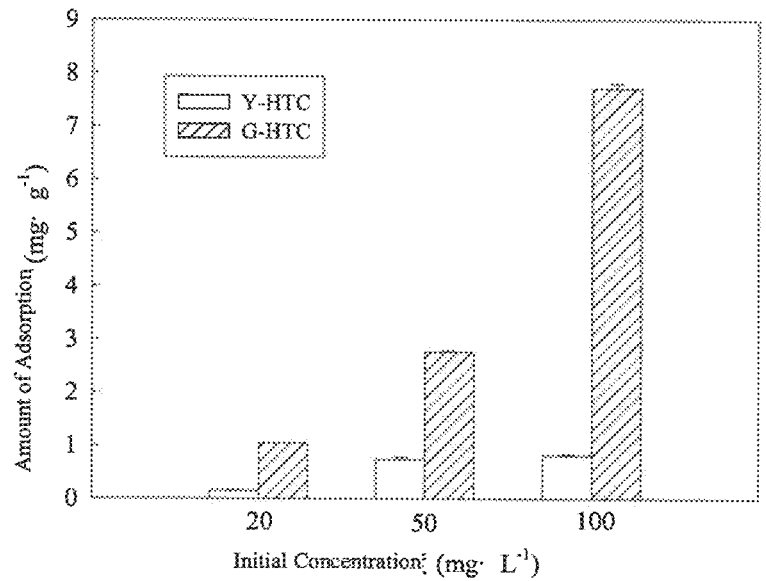
FIG. 4 shows schematic diagram of adsorption effects of hydrothermal carbon based on modified cow dung biogas residue and hydrothermal carbon based on unmodified cow dung biogas residue for ammonia nitrogen (NH$_4^+$—N) at different initial concentrations in actual waste water in a pig farm.

The detection results are shown in FIG. 4. As can be seen, the maximum adsorptive capacity of G-HTC for ammonia nitrogen ($NH_4^+$—N) is 9.51 times of that of Y-HTC.

Those skilled in the art can understand that all terms used herein (including technical terms and scientific terms) are intended to have the common meanings that are comprehended by those having ordinary skills in the art to which the present invention belongs, unless otherwise defined.

It should also be understood that those terms defined in general dictionaries should be understood as having meanings in line with their meanings in the context of the prior art, and should not be comprehended with meanings that are too ideal or formal, unless otherwise defined herein.

While the object, technical scheme, and beneficial effects of the present invention are described in detail in the above specific embodiments, it should be understood that those embodiments are just specific embodiments of the present invention, without constituting any limitation to the present invention. Any modification, equivalent replacement, or improvement made without departing from the spirit and principle of the present invention shall be deemed as falling in the scope of protection of the present invention.

The invention claimed is:

1. A method for preparing hydrothermal carbon based on malic acid and $KMnO_4$ combined modified cow dung biogas residue, comprising the following steps:

1) mixing cow dung biogas residue and malic acid solution homogeneously and then performing ultrasonic treatment, to obtain malic acid modified cow dung biogas residue;
2) adding $KMnO_4$ solution to the malic acid modified cow dung biogas residue obtained in the step 1), mixing homogenously and then performing a hydrothermal reaction, to obtain the hydrothermal carbon based on cow dung biogas residue;

wherein, the filling degree of reactor of hydrothermal reaction is 60%~80%.

2. The method for preparing hydrothermal carbon based on malic acid and $KMnO_4$ combined modified cow dung biogas residue according to claim 1, wherein, the cow dung biogas residue has 7%~10% moisture content and is filtered through a 20-mesh screen in the step 1).

3. The method for preparing hydrothermal carbon based on malic acid and $KMnO_4$ combined modified cow dung biogas residue according to claim 1, wherein, the ultrasonic treatment is performed at 35~85° C., 40 KHz and 100 W for 40~90 min.

4. The method for preparing hydrothermal carbon based on malic acid and $KMnO_4$ combined modified cow dung biogas residue according to claim 1, wherein, the concentration of the malic acid solution is 0.5~1.0 mol·$L^{-1}$, and the solid to liquid ratio of the cow dung biogas residue to the malic acid is 1:6~1:10.

5. The method for preparing hydrothermal carbon based on malic acid and $KMnO_4$ combined modified cow dung biogas residue according to claim 1, wherein, the concentration of the $KMnO_4$ solution is 0.13~0.25 mol·$L^{-1}$, and the solid to liquid ratio of the malic acid modified cow dung biogas residue to the $KMnO_4$ solution is 1:5~1:10.

6. The method for preparing hydrothermal carbon based on malic acid and $KMnO_4$ combined modified cow dung biogas residue according to claim 1, wherein, the reaction temperature of the hydrothermal reaction is 180~220° C., the reaction time is 2~3 h, and the heating rate is 1~5° C.·$min^{-1}$.

* * * * *